United States Patent [19]

Jasinski et al.

[11] Patent Number: 5,063,289

[45] Date of Patent: Nov. 5, 1991

[54] COMBINED MOUSE AND TRACKBALL

[75] Inventors: Joseph E. Jasinski, Delray Beach, Fla.; Charles H. Lingle, Nicholasville, Ky.; Richard F. Pollitt, Highland Beach, Fla.; David W. Shuman, Lexington, Ky.

[73] Assignee: Lexmark International, Inc., Greenwich, Conn.

[21] Appl. No.: 594,893

[22] Filed: Oct. 9, 1990

[51] Int. Cl.[5] .................. G01V 9/04; G06M 7/00; H01J 40/14

[52] U.S. Cl. ............................ 250/221; 340/710; 74/471 XY

[58] Field of Search ............... 250/221, 229; 340/706, 340/709, 710; 74/471 XY

[56] References Cited

U.S. PATENT DOCUMENTS

| D. 291,318 | 8/1987 | Kim et al. | D 14/114 |
|---|---|---|---|
| 4,562,347 | 12/1985 | Hovey et al. | 250/221 |
| 4,595,070 | 6/1986 | Hodges | 340/710 |
| 4,786,892 | 11/1988 | Kubo et al. | 340/365 |
| 4,906,843 | 3/1990 | Jones et al. | 250/221 |
| 4,917,516 | 4/1990 | Retter | 340/710 |
| 4,939,508 | 7/1990 | Lawrence et al. | 340/710 |
| 4,952,919 | 8/1990 | Nippoldt | 74/471 XY |

*Primary Examiner*—David C. Nelms
*Assistant Examiner*—John R. Lee
*Attorney, Agent, or Firm*—John A. Brady

[57] ABSTRACT

A combined mouse and trackball having its control ball (15) extend past cover 1. Cover 1 has neck hinges (5) so that it pivots in relations to opposing cover (17). A cable (33) at the front communicates with the computer receiving the control signals from the ball. A switch (43) reverses the significance of front-to-back signals from the ball depending on whether an actuator (45) integral with cover 1 engages the switch. In the closed position of cover 1 the bottom of the devise is flat and the ball is upward for use as a trackball. In the open position of cover 1 the device is formed into a mouse with front and rear surfaces (67, 69) to support the ball for frictional movement on a table (71). Latch surfaces ((25, 57 and 25, 65) hold the covers in the two positions until they are manually released.

14 Claims, 6 Drawing Sheets

COMBINED MOUSE AND TRACKBALL

TECHNICAL FIELD

This invention relates to hand-operated computer entry devices, specifically the mouse and the trackball. In both of these devices a spherical member is rotated to define corresponding movements of a cursor on the screen of a computer monitor. In operation, (1) used as a mouse the device is moved across a surface with the spherical member moved frictionally by that surface; (2) used as a trackball the device is stationary with the spherical member moved by direct contact of the operator's hand. This invention relates to a single device suited for use both as a mouse and a trackball.

BACKGROUND OF THE INVENTION

The trackball and the mouse have been recognized as equivalent in many respects, such as in the introductory portion of U.S. Pat. No. 4,917,516 to Retter, which reads at column 5, lines 57 through 65: "Trackballs are essentially 'upside down' mice. The major advantage over mice is that the location remains constant and close to the keyboard which allows easier alternation between the keyboard and the trackball. Trackballs require less desk space then most mice. The major disadvantage of a trackball, however, is that it is less controllable than a mouse and it is somewhat less intuitive in use. Like mice, however, trackballs require the hand to leave the keyboard,"

U.S. Pat. No. 4,595,070 to Hodges has the following language equating somewhat the mouse and the trackball at column 2, lines 30 though 35: "A mechanical mouse contains a track-ball as the movement sensing element. Such a ball is mounted in a box along with several position encoders. When the ball rolls across a surface, its rotation speed is approximately proportional to the speed at which a cursor moves upon a CRT screen."

U.S. Pat. No. 4,562,347 to Hovey is directed to a combined mouse and trackball. This is achieved by having the control ball protrude from both sides of the device, which differs basically from the instant invention. Moreover, when the device of the Hovey patent is used as a trackball, it can not be simply rested on a surface since the control ball would not be free to move by hand manipulation. Also, when the operation is that of a mouse, the operator must avoid interference with the control ball from the top as the operator grasps and moves the device.

A prior combination mouse and trackball sold under the name Penny+Giles also has the control ball protrude from both sides of the device. The device has an upward slope when positioned as a trackball with the ball near the front end. The upward slope positions the bottom of the ball above a surface on which the device rests. The device is substantially longer than a standard mouse. When used as a mouse, the device is tipped forward by its operator to bring the front end into contact with the surface on which the device rests. The bottom surface terminates behind the trackball, and the front and back contacts are located to bring the ball in contact with surface to be moved frictionally by the surface when moved as a mouse.

Accordingly, when the device is operated as a mouse, the operator must continuously tip it forward, which is subject to error and fatigue.

DISCLOSURE OF THE INVENTION

This invention is a combined mouse and trackball having the control ball supported in a hinged cover. In one position of the device cover, the cover is in a retracted position providing a wide support surface with the control ball generally exposed and opposite the support surface so that the device is operable as a trackball. In a second position the device cover is in an extended position to provide contact lines with respect to a flat surface which position the control ball in contact with the flat surface for use as a mouse. A switch is reversed by a member which moves with the cover between the retracted and expanded positions to reverse the significance of the control ball movement in the direction from front to back. The cover is held in the two positions by ledges which latch against abutments, but which are integral with the cover and yieldable to unlatch under directed pressure from an operator. In each of the two positions the device has an external configuration closely similar to conventional mouse or a conventional trackball, depending on the position of the cover.

BRIEF DESCRIPTION OF THE DRAWING

The details of this invention will be described in connection with the accompanying drawing, in which.

BEST MODE FOR CARRYING OUT THE INVENTION

Figure 1:
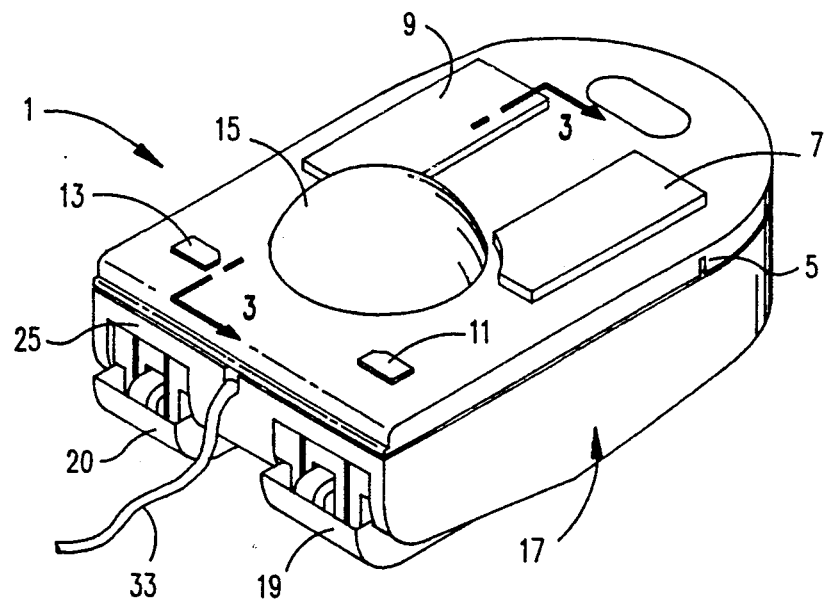
FIG. 1 is a perspective view of the device when set as a trackball.

This device has a cover 1, having a generally rectangular major outline. Cover member 1 is molded of Lexan polycarbonate, a trademarked product of General Electric Co., which is both sturdy and yieldable under moderate pressures as will be described. Cover 1 has notches 5 symmetrical on opposite sides to provide a one-piece or necked hinge (often termed a living hinge). Trackball pressure keys 7 and 9, trackball latch keys 11 and 13, and control sphere or ball 15 protrude through holes in cover 1.

Figure 2:
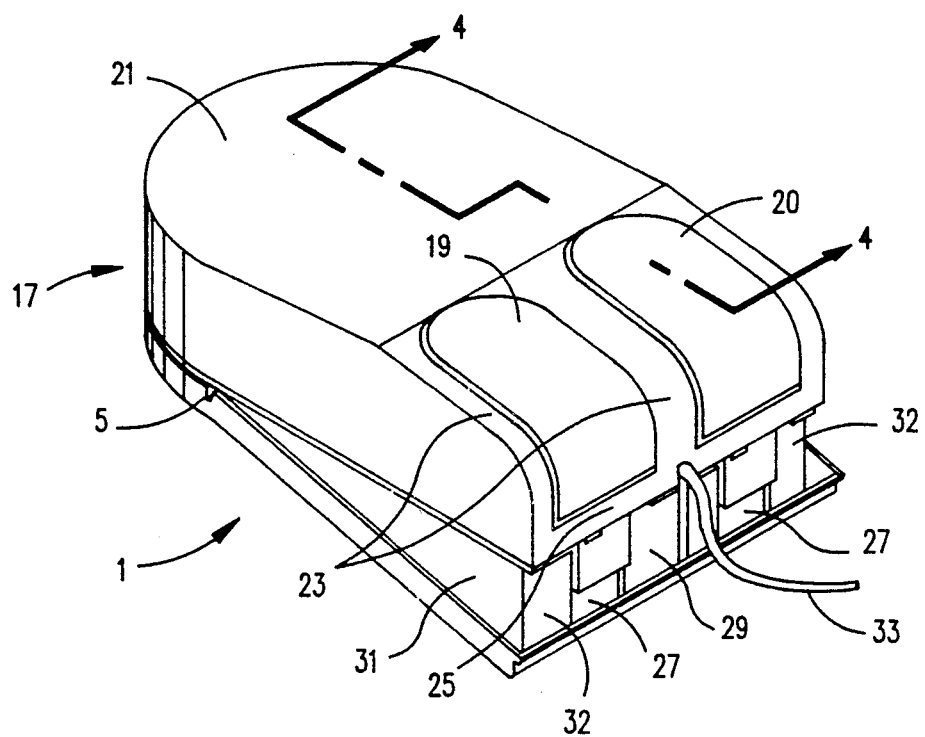
FIG. 2 is a perspective view of the device when set as a mouse.

Cover 17 is also molded of the same polycarbonate material. Mouse pressure keys 19 and 20 are attached with studs as will be described. The other portions of cover 17 including the flat wide area 21 (FIG. 2), the inwardly curved, mouse key area 23, and the front latch bar 25 (FIG. 1) are molded in one piece as part of cover 17. Similarly, (FIG. 2) the latch panels 27, the central panel 29, the side panels 31, and the left and right corner panels 32 are molded in one piece as part of cover 1. (Since the device is symmetrical on opposite sides, elements such as side panel 31 are shown from only one side.) Electrical cable 33 extends from cover 17 to connect the internal electrical elements of the device to a computer with which it interacts, as is conventional.

Shown illustratively only (FIG. 3) is a microprocessor 34, which is powered by cable 33 and which transmits digital information over cable 33. Microprocessor 34 receives position information from the movement of ball 15 as will be described and computes coordinate information describing that movement which is transmitted on cable 33. Such a microprocessor 34 and its functioning is basically conventional and forms no part of this invention. Also shown is pressure switch 36 which is positioned to be operated by the stem 38 of latch key 11. Microprocessor 34 interprets each activation of switch 36 as a reversal of status.

Figure 5:
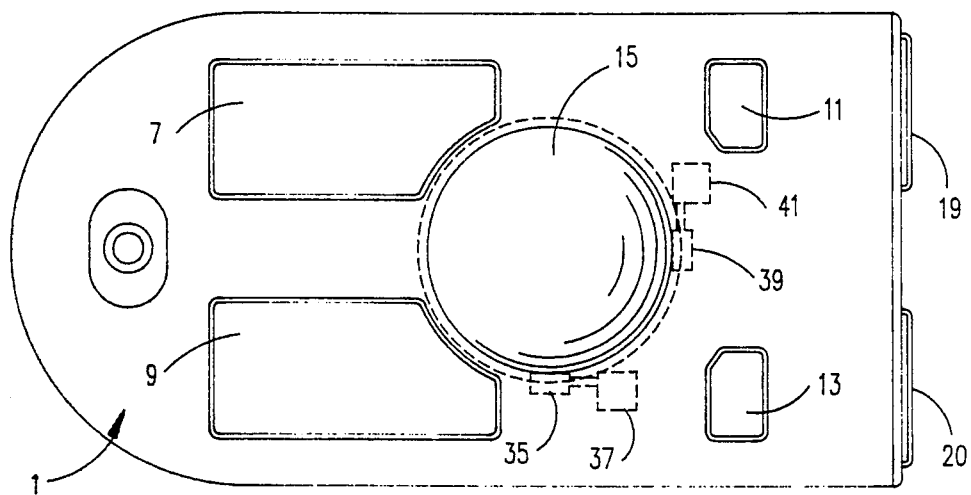
FIG. 5 is a plan view of the device when set as a trackball.

As shown in FIG. 5, ball 15 is physically confined within the device so that it is free only to rotate, with such rotation sensed by orthogonal, frictionally-driven members, shown illustratively as roller 35, which rotates with ball 15 for lateral movement while slipping with front-and-back movements. Movement of roller 35 is sensed by encoder 37, which may be an optical encoder, to produce information which is one component of position information to microprocessor 34. Similarly front-and-back movements are followed by roller 39, and movement of roller 39 is sensed by encoder 41 to produce information which is the other component of position information to microprocessor 34. Such sensing is basically conventional and forms no part of this invention.

Figure 3:
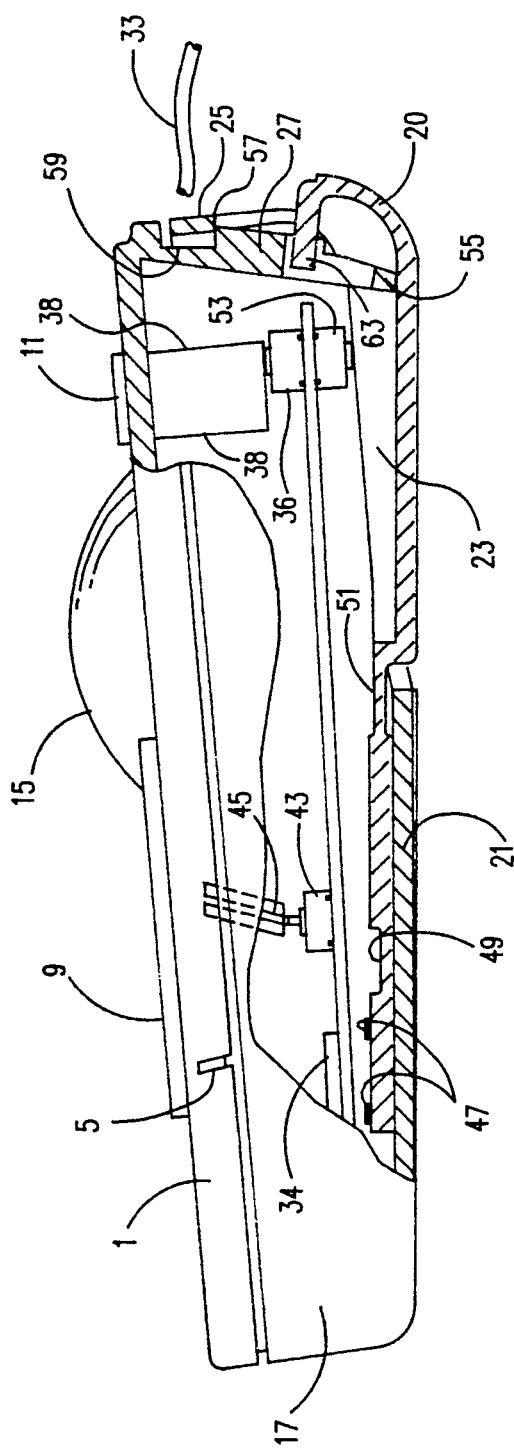
FIG. 3 is a partially sectioned, side view, the sectioning being through the line 3—3 of FIG. 1, of the device when set as a trackball.
Figure 4:
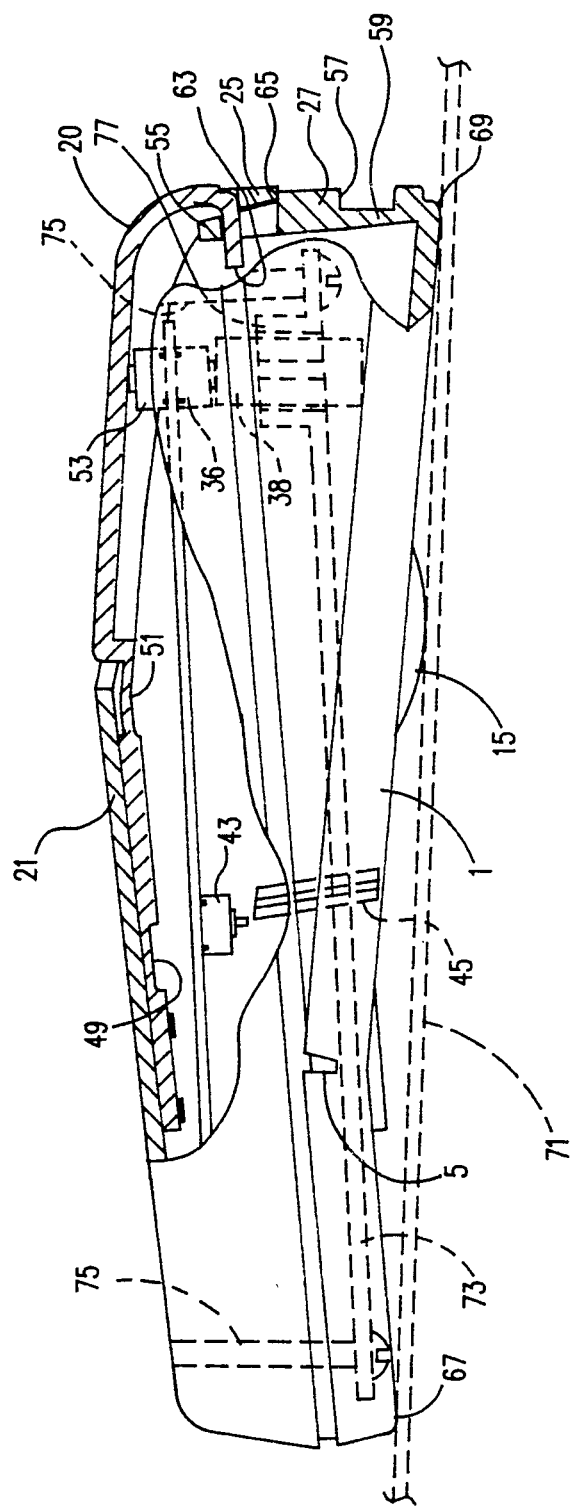
FIG. 4 is a partially sectioned, side view, the sectioning being through the line 4—4 of FIG. 2, of the device when set as a mouse.

Referring to FIG. 3, orientation switch 43 is contacted by switch actuator 45, while FIG. 4 shows switch actuator 45 moved away from switch 43 since switch actuator 45 is an extension of cover 1 and moves with it. Accordingly, switch actuator 45 brings switch 43 to one status when cover 1 is closed as in FIG. 3 and to the opposite status when cover 1 is open as in FIG. 4.

FIG. 3 shows the details and manner of attachment of mouse key 20 (the mouse key 19 being entirely symmetrical and therefore essentially identical in these respects). Key 20 is attached to cover 21 by studs 47 which are integral with cover 21, pass through mating holes in key 20, and are swaged (heated and deformed) so as to tightly hold key 20 to cover 21. Key 20 has a first neck hinge 49 near studs 49 and a second neck hinge 51 near it center.

Pressure switch 53, which is controlled by mouse key 20 when the device is set as a mouse, is spaced from key 20 in FIG. 3 since bottom rail 55, which is integral with latch panel 27, forces key 20 to a position essentially coplanar with flat cover area 21. This provides a flat, bottom surface for the device to be stabilized on a table or other flat surface while ball 15 is moved by the hand of the operator. Front panel 27 latches cover 1 into the closed position by ledge 57 of panel 27 abutting latch bar 25. Front panel 27 near its junction with cover 1 has neck hinge 59 which is a thin dimension in panel 27 to facilitate an operator opening cover 1 by simply pulling covers 1 and 17 apart. Such pressure causes bar 25 to apply an inward turning force to panel 27 through ledge 57 to cause panel 27 to pivot inward on hinge 59 and thereby separate ledge 57 from bar 25 so that cover 1 is free to move to the open position shown in FIG. 4.

As shown in FIG. 4, when the device is set as a mouse, mouse key 20 is pulled into a slope with respect to cover 21 by inward extension 63 of key 20 being contacted and moved by rail 55. Abutment 65 of latch panel 27 contacts latch bar 25 to hold the mouse setting. Key 20 is flexed at hinge 51 and further flexes at hinge 49 when an operator depresses key 20, which contacts switch 53 and closes it. Rear surface 67 of cover 1 and front surface 69 of cover 1 provide lines of contact stabilizing the device as a mouse and positioning ball 15 to contact and be frictionally moved by a table 71 (shown illustratively it dotted outline) on which the device will rest with ball 15 downward and mouse key 20 upward, with surfaces 67 and 69 resting on the table 71.

FIG. 4 also shows an planar internal support 73, which is immediately under and co-extensive with cover 1 when cover 1 is retracted, and which is supported by studs 75 molded into cover 17. Internal support 73 has holes surrounding and positioning ball 15 and latch stem 38, operative with switch 36, as well as an identical stem (not shown) of latch key 13. Surrounding skirts 77 extend from support 73 as further support for stem 38. Holes in support 73 also surround switch actuator 45 and stems (not shown) from keys 7 and 9.

Figure 7:
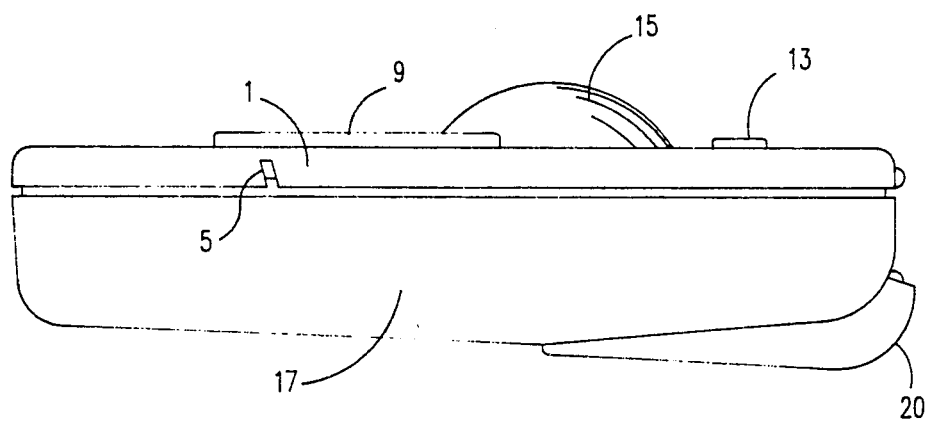
FIG. 7 is a side view of the device when set as a trackball.
Figure 6:
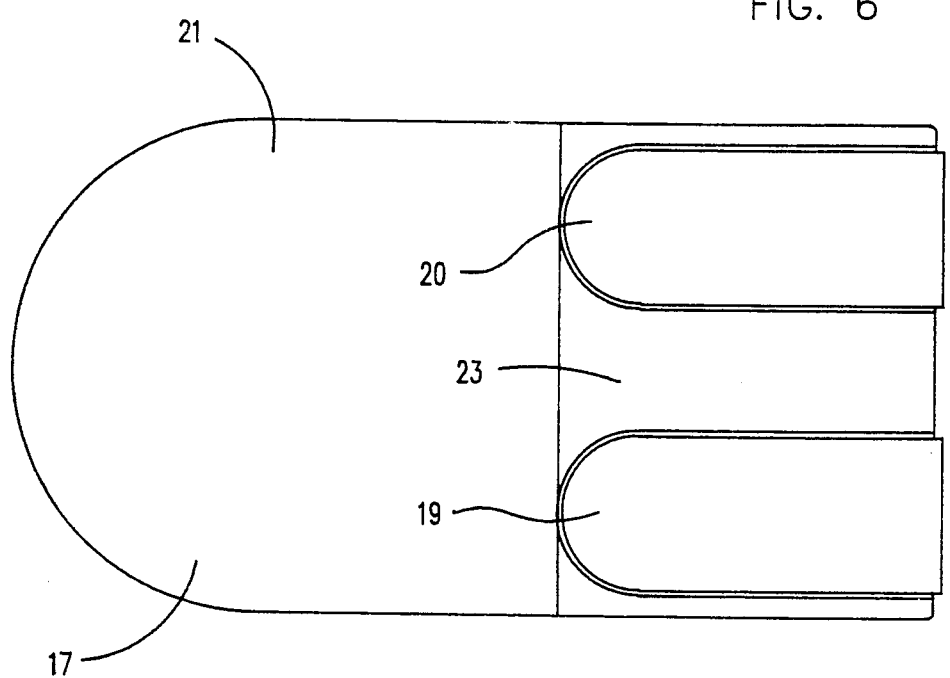
FIG. 6 is a plan view of the device when set as a mouse.
Figure 8:
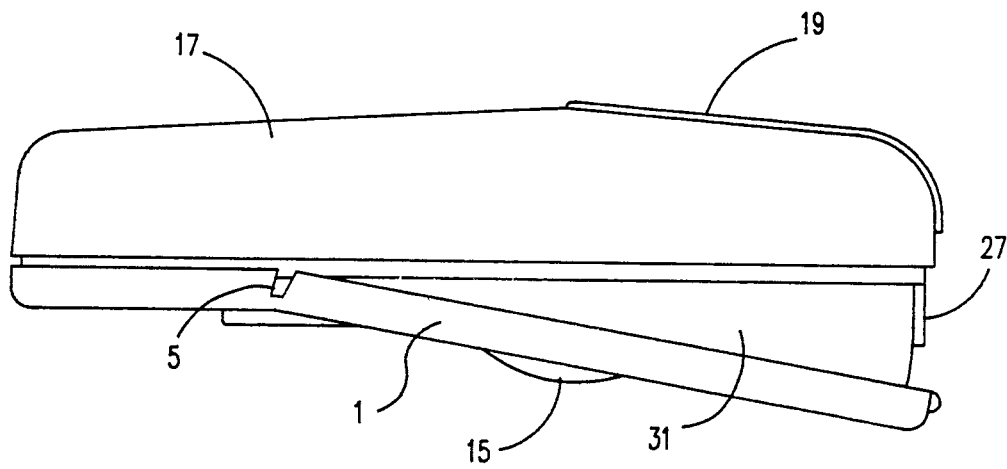
FIG. 8 is a side of the device when set as a mouse.
Figure 9:
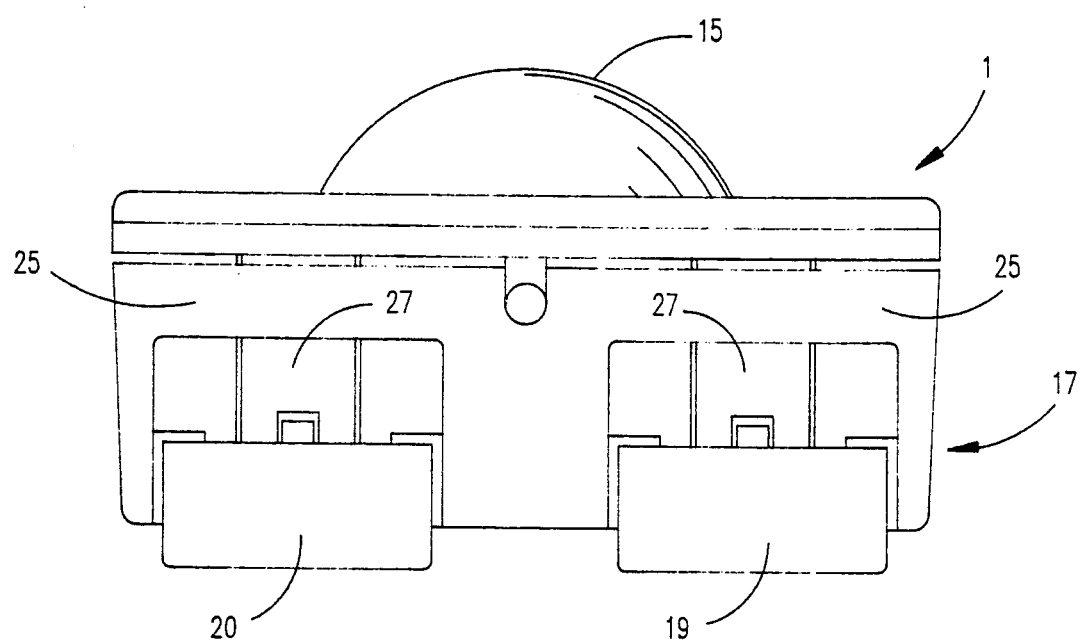
FIG. 9 is a front view of the device when set as a trackball.
Figure 10:
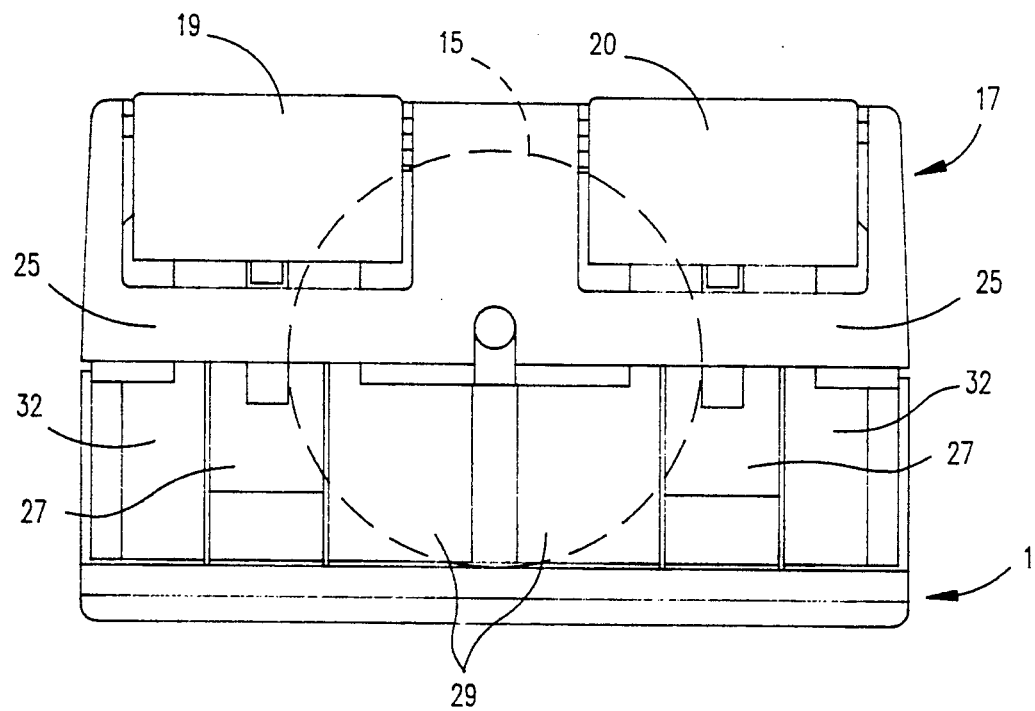
FIG. 10 is a front view of the device when set as a mouse.

FIGS. 7 and 8 show the device externally from the side, and FIGS. 9 and 10 show the device externally from the front. The device is generally the size of the human hand and may be readily moved and picked up by hand.

In operation the keys are used conventionally. In the mouse setting the keys 19 and 20 are readily held down by the fingers of the operator if that is the desired input while the device as a whole is moved over a table or other service. Normally, the cursor is moved by moving the device to a place representative of a given signal to a computer and then a predetermined one or both of the keys 19 and 20 are actuated by being depressed by hand. In the trackball setting, latch keys 11 and 13 are used when the desired input is that such keys be held down while the ball 15 is moved. The device may be rested on a table with the ball 15 upward while the ball 15 is moved by the fingers or hand of the operator. Single inputs are made by the fingers of an operator depressing keys 7 and 9.

Changing the setting is readily done using two hands. When the device is set as a trackball, covers 1 and 17 are grasped by each hand of the operator and pulled apart. Panel 27 rotates inwardly on hinge 59, and cover 1 is rotated on hinges 5 to the open position. Panel 27 moves outward by inherent resilience when covers 1 and 17 reach the mouse position, and latch bar 25 then engages abutment 65 to hold the new setting in place.

When the device is set as a mouse and is reset as a trackball, front panels 27 are pushed inward by the fingers of the same hand which grasps cover 1, while the other hand grasps cover 17. Panel 27 is moved a small amount so that abutment 65 clears latch bar 25, and covers 1 and 17 are then pushed together. Rail 55 pushes keys 19 and 20 outward. Upon releasing panel 27, panel 27 moves outward by inherent resilience, and latch bar 25 engages abutment 57 to hold the new setting in place.

The device is rotated one-half revolution (180 degrees) around the front-to-back axis between operations as a trackball and as a mouse. When so rotated, the significance of movement of ball 15 in the front-to-back direction is reversed (i.e., a top-to-bottom movement of the device as a mouse results in the cursor going downward, but a front-to-rear movement of the ball of a standard mouse which is rotated and used as a trackball results in the cursor going upward). The automatic reversal of the setting of switch 43 is an input to microprocessor 34 which reverses the significance between the two settings in the front-to-back direction.

Of course, human operators normally develop manual skills which would permit them to change setting differently but in ways essentially equivalent to the two-handed method discussed above. Other variations within the spirit and scope of the invention will be apparent and may be developed in the future, for which patent coverage is sought as provided by law, with particular reference to the accompanying claims.

We claim:

1. A combined mouse and trackball comprising a control ball to produce signals describing the rotation of said ball, a first cover and a second cover between which said ball is supported for rotation with only one continuous surface of said ball extending past said covers, at least one of said covers being hinged for movement between a retracted position and an extended position, a first latch to latch said covers in a first position in which said one surface of said ball is opposite a flat surface, and a second latch to latch said covers in a second position in which said one surface of said ball is supported on opposite sides to frictionally engage a flat surface.

2. The combined mouse and trackball as in claim 1 in which said hinge of at least one of said covers is a neck hinge formed by opposed notches in said first covers.

3. The combined mouse and trackball as in claim 2 also comprising at least one pressure key extending through a hole in said second cover and in which said first cover comprises a rail extending from and integral with said first cover, said rail pushing said pressure key to form part of said flat surface when said covers are in said retracted position.

4. The combined mouse and trackball as in claim 1 also comprising at least one pressure key extending through a hole in said second cover and in which said first cover comprises a rail extending from and integral with said first cover, said rail pushing said pressure key to form part of said flat surface when said covers are in said retracted position.

5. The combined mouse and trackball as in claim 4 in which said at least one pressure key has an extension which is engaged by said rail when said covers are in said extended position to pull said pressure key into position for operation as mouse switches.

6. The combined mouse and trackball as in claim 3 in which said at least one pressure key has an extension which is engaged by said rail when said covers are in said extended position to pull said pressure key into position for operation as mouse switches.

7. The combined mouse and trackball as in claim 6 also comprising a switch having a first output status to define one significance of front-to-back rotation of said control ball and a second output status to reverse the significance of front-to-back rotation of said control ball from said one significance, said switch being physically moved to said first status when said covers are in the retracted position and being physically moved to said second status when said covers are in the extended position.

8. The combined mouse and trackball as in claim 1, also comprising a switch having a first output status to define one significance of front-to-back rotation of said control ball and a second output status to reverse the significance of front-to-back rotation of said control ball from said one significance, said switch being physically moved to said first status when said covers are in the retracted position and being physically moved to said second status when said covers are in the extended position.

9. The combined mouse and trackball as in claim 2, also comprising a switch having a first output status to define one significance of front-to-back rotation of said control ball and a second output status to reverse the significance of front-to-back rotation of said control ball from said one significance, said switch being physically moved to said first status when said covers are in the retracted position and being physically moved to said second status when said covers are in the extended position.

10. The combined mouse and trackball as in claim 3, also comprising a switch having a first output status to define one significance of front-to-back rotation of said control ball and a second output status to reverse the significance of front-to-back rotation of said control ball from said one significance, said switch being physically moved to said first status when said covers are in the retracted position and being physically moved to said second status when said covers are in the extended position.

11. The combined mouse and trackball as in claim 4, also comprising a switch having a first output status to define one significance of front-to-back rotation of said control ball and a second output status to reverse the significance of front-to-back rotation of said control ball from said one significance, said switch being physically moved to said first status when said covers are in the retracted position and being physically moved to said second status when said covers are in the extended position.

12. The combined mouse and trackball as in claim 5, also comprising a switch having a first output status to define one significance of front-to-back rotation of said control ball and a second output status to reverse the significance of front-to-back rotation of said control ball from said one significance, said switch being physically moved to said first status when said covers are in the retracted position and being physically moved to said second status when said covers are in the extended position.

13. A combined mouse and trackball comprising a control ball to produce signals describing the rotation of said ball, a first cover and a second cover between which said ball is supported for rotation, at least one of said covers being hinged for movement between a retracted position and an extended position, a switch having a first output status to define one significance of front-to-back rotation of said control ball and a second output status to reverse the significance of front-to-back rotation of said control ball from said one significance, switch control means integral with one of said covers to control said switch when said covers are in the retracted position to be in said first output status and to control said switch when said covers are in the extended position to be in said second output status.

14. The combined mouse and trackball as in claim 13 in which an electrical cable extends from the front of said combined mouse and trackball and said covers are hinged for movement to extend and retract the separation of said covers at the rear of said combined mouse and trackball.

* * * * *